(12) United States Patent
George

(10) Patent No.: US 7,137,398 B2
(45) Date of Patent: Nov. 21, 2006

(54) TREE STAND COVER AND METHOD OF USE THEREOF

(76) Inventor: Frady George, 943 Evans Cook Rd., Canton, GA (US) 30114

(*) Notice: Subject to any disclaimer, the term of this patent is extended or adjusted under 35 U.S.C. 154(b) by 161 days.

(21) Appl. No.: 10/833,196

(22) Filed: Apr. 27, 2004

(65) Prior Publication Data

US 2004/0211625 A1    Oct. 28, 2004

Related U.S. Application Data

(60) Provisional application No. 60/466,156, filed on Apr. 28, 2003.

(51) Int. Cl.
    *E04H 15/04* (2006.01)
(52) U.S. Cl. .................. 135/90; 135/96; 135/901; 182/187; 182/135; 150/154
(58) Field of Classification Search ............ 135/90, 135/96, 115, 117, 119, 901, 907, 120.4; 182/187–188, 182/135; 43/1; 150/154, 165; 224/577; 383/36, 34.1
See application file for complete search history.

(56) References Cited

U.S. PATENT DOCUMENTS

| | | | | |
|---|---|---|---|---|
| 3,116,808 A | * | 1/1964 | Riley ................... | 182/129 |
| 3,358,789 A | * | 12/1967 | Laun ................... | 182/113 |
| 4,134,474 A | * | 1/1979 | Stavenau et al. ....... | 182/187 |
| 4,274,508 A | | 6/1981 | Hughes et al. | |
| 4,493,395 A | | 1/1985 | Rittenhouse | |
| 4,505,286 A | * | 3/1985 | Madion ................ | 135/90 |
| 4,805,655 A | | 2/1989 | Justice | |
| 4,951,696 A | | 8/1990 | Jones, Sr. | |
| 5,056,817 A | * | 10/1991 | Fuller .................. | 280/770 |
| 5,165,500 A | * | 11/1992 | Bass ................... | 182/187 |
| 5,218,982 A | | 6/1993 | Kenji | |
| 5,291,848 A | * | 3/1994 | Wilhelm et al. ....... | 114/361 |
| 5,482,137 A | * | 1/1996 | McNeill ............... | 182/187 |
| 5,528,849 A | | 6/1996 | Plinta | |
| 5,613,512 A | * | 3/1997 | Bean .................. | 135/90 |
| 5,617,932 A | * | 4/1997 | Stuart ................. | 182/187 |
| 5,983,913 A | | 11/1999 | Fargason | |
| 6,068,325 A | * | 5/2000 | Hughes ............. | 296/100.16 |
| 6,243,979 B1 | * | 6/2001 | Seats et al. .......... | 42/94 |
| 6,306,471 B1 | | 10/2001 | Pitman et al. | |
| 6,440,415 B1 | | 8/2002 | Johnson | |
| 6,499,496 B1 | | 12/2002 | Young | |
| 6,510,922 B1 | | 1/2003 | Hodnett | |
| 6,941,961 B1 | * | 9/2005 | Eastman, II ......... | 135/121 |
| 2002/0069904 A1 | * | 6/2002 | Robinson ............. | 135/87 |
| 2004/0149329 A1 | * | 8/2004 | Hess et al. .......... | 135/156 |

* cited by examiner

*Primary Examiner*—Winnie Yip
(74) *Attorney, Agent, or Firm*—Williamson Intellectual Property Law, LLC; Thomas R. Williamson, III

(57) ABSTRACT

The present invention is a device formed of waterproof or water-resistant fabric having a central section comprising a top, front and bottom, to which is joined side portions, thereby providing coverage for slipping over a tree-mounted hunting stand, including preferably both standing and seating portions thereof. The cover is pulled proximate the surface of the tree to which the stand is mounted, and extensions at the top and bottom of the cover provide an interface that prevents the incursion of water. The cover is then held in place via suitable attachment means, such as, for exemplary purposes only, bungee cords, wherein the hook ends of the bungee cords connect with apertures in the top and bottom extensions of the cover.

15 Claims, 4 Drawing Sheets

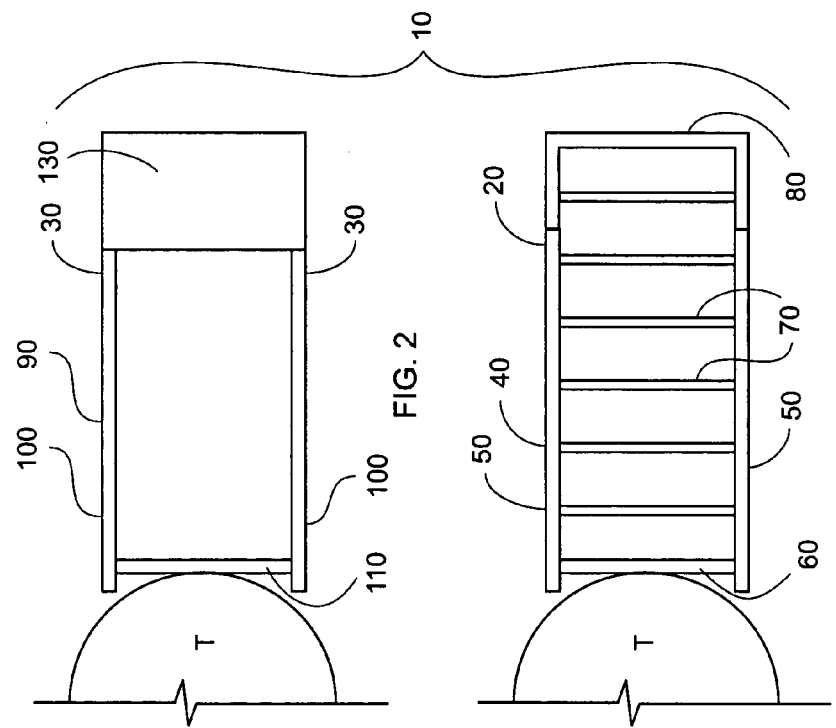
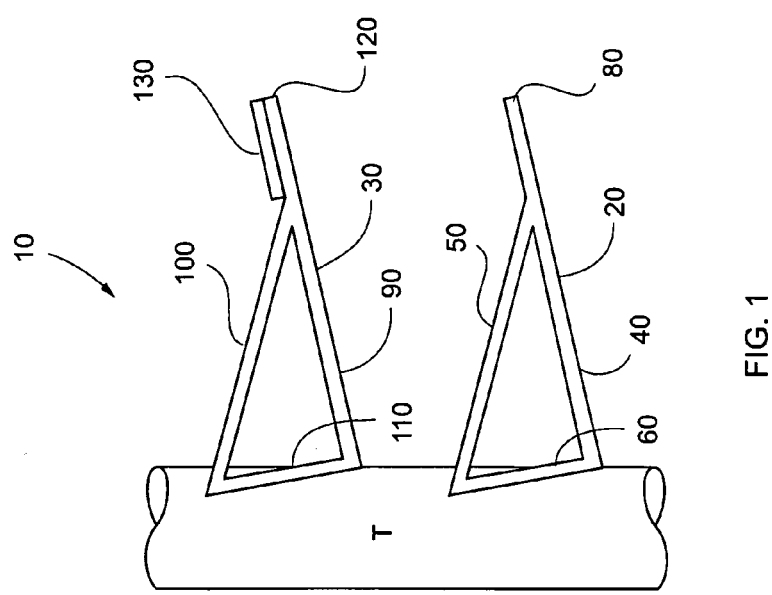
FIG. 1
FIG. 2
FIG. 3
PRIOR ART

TREE STAND COVER AND METHOD OF USE THEREOF

CROSS-REFERENCE AND PRIORITY CLAIM TO RELATED APPLICATIONS

To the fullest extent permitted by law, the present non-provisional patent application claims priority to and the full benefit of provisional patent application entitled "Tree Stand Cover", filed on Apr. 28, 2003, having assigned Ser. No. 60/466,156.

TECHNICAL FIELD

The present invention relates generally to covers for hunting tree stands, and more specifically to a device and method for covering tree stands, wherein the device conforms to the shape of a tree and is securable via bungee cords, or the like. The present invention is particularly advantageous in use and application due to its ability to permit a hunter to leave his tree stand in the field without having to be concerned that upon his/her return, it would be covered in snow or natural detritus, or would be wet. Alternatively, the present invention can provide a camouflaged appearance that does not discourage wildlife from frequenting the area in which the tree stand and cover are located.

BACKGROUND OF THE INVENTION

A game hunter will often remain stationary for long periods of time in order to remain unobserved by game animals. Accordingly, it is necessary for hunters to have reasonably comfortable locations in which to remain motionless. One such location is a stand, or framework, attached to a tree, wherein the hunter can elevate his position in order to better observe game and become less visible. Typical tree stands have facilities for both standing, during periods of watch, and sitting, in order to provide more comfort.

Sometimes while deer hunting, a hunter will leave his or her tree stand mounted to the base of a tree overnight, or during other periods of non-use. This is desirable because the stand does not have to be carried to and from the stand site or be removed and reattached to the tree each day, or each such time the hunter returns to the site. In addition, this minimizes the noise made by the hunter when he comes and goes from the site; a benefit because such noise tends to scare deer and other animals away from the area.

Leaving a stand at the base of a tree, however, has drawbacks. If the tree stand is left overnight, for example, deer may see and/or smell the stand and avoid the area altogether. Also, a tree stand may get wet from rain or dew, or may get covered by objectionable detritus from flora and/or fauna, thereby making the tree stand uncomfortable for utilization when the hunter returns.

Therefore, it is readily apparent that there is a need for an apparatus and method to permit portable tree stands to remain behind when a hunter departs for an extended period of time, such as a day, while at the same time protecting the tree stand from environmental conditions, such as water and detritus. There is a further need for such an apparatus to not be readily sensed by deer and/or other animals. As will be more fully detailed hereinbelow, it is to the provision of such an apparatus and method that the present invention is directed.

BRIEF SUMMARY OF THE INVENTION

Briefly described, in a preferred embodiment, the present invention overcomes the above-mentioned disadvantages and meets the recognized need for such a device by providing embodiments directed to a cover for a tree stand utilized during hunting.

According to its major aspects and broadly stated, the present invention in its preferred form is a weatherproof, camouflaging cover for tree stands of the type utilized by hunters while waiting to harvest game animals. The cover protects the tree stand from moisture and debris when the stand is not being utilized by the hunter.

More specifically, the present invention, in the preferred form, is a waterproof or water-resistant fabric device having a conformation for slipping over a tree-mounted hunting stand, including both standing and seating portions thereof. The device has an open end for placement proximate the surface of the tree to which the stand is mounted, wherein extensions at the top and bottom of the cover provide an interface that minimizes and/or prevents the incursion of water. The cover is held in place via suitable attachment means, such as, for exemplary purposes only, bungee cords, wherein the hook ends of the bungee cords connect with apertures in the top and bottom extensions of the cover.

Preferably, the present invention is sized to fit over both the seat portion and the standing portion of a tree stand. Alternately, the cover can be sized to fit only the seat portion, including any cushioning material such as, fabric, foam, and/or rubber, and may be of a size and shape to be a 'universal' fit for existing tree stands.

Accordingly, a feature and advantage of the present invention is its ability to keep a tree stand substantially dry.

Another feature and advantage of the present invention is its ability to prevent accumulation and contamination of a tree stand by detritus from natural sources such as flora and fauna, including, for example, leaves and animal excrement.

Still another feature and advantage of the present invention is its ability to provide camouflage appearance, thereby encouraging continued visitation to the surrounding area by various game animals.

Yet another feature and advantage of the present invention is its ability to adaptively fit a large variety of different commercially available and/or individually hand-crafted tree stands.

Yet still another feature and advantage of the present invention is that it can be fabricated of low cost and readily available materials.

Still a further feature and advantage of the present invention is that it can suppress human odors that might otherwise frighten away game.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 1 is a side view of a two-component tree stand apparatus according to the prior art;

FIG. 2 is a top view of a seat platform component according to the prior-art tree stand apparatus of FIG. 1;

FIG. 3 is a top view of a standing platform component apparatus according to the prior-art tree stand apparatus of FIG. 1;

DETAILED DESCRIPTION OF THE PREFERRED AND SELECTED ALTERNATIVE EMBODIMENTS

Figure 6:
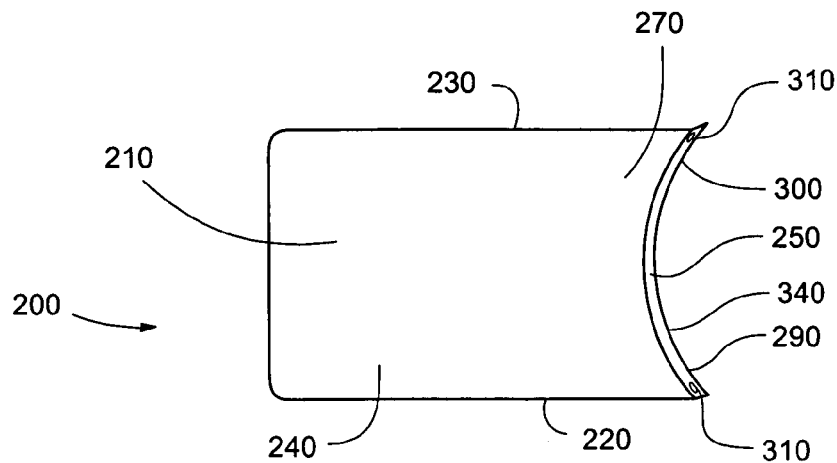
FIG. 6 is a top view of the tree stand cover depicted in FIG. 4.

In describing the preferred and selected alternate embodiments of the present invention, as illustrated in FIGS. 4–8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–3, wherein prior-art apparatus is tree stand 10. Prior-art tree stand 10 typically has two sections, standing platform component 20 and seat platform component 30. Standing platform component 20 has frame 40, wherein frame 40 comprises side bars 50, attachment plate 60, foot supports 70 and end member 80. Seat platform component 30 comprises frame 90, side bars 100, attachment plate 110, end member 120 and seat 130. Seat platform component 30 and standing platform component 20 are removably affixed to tree T, wherein seat platform component 30 is positioned above standing platform component 20 at a distance selectable by a user.

Figure 5:
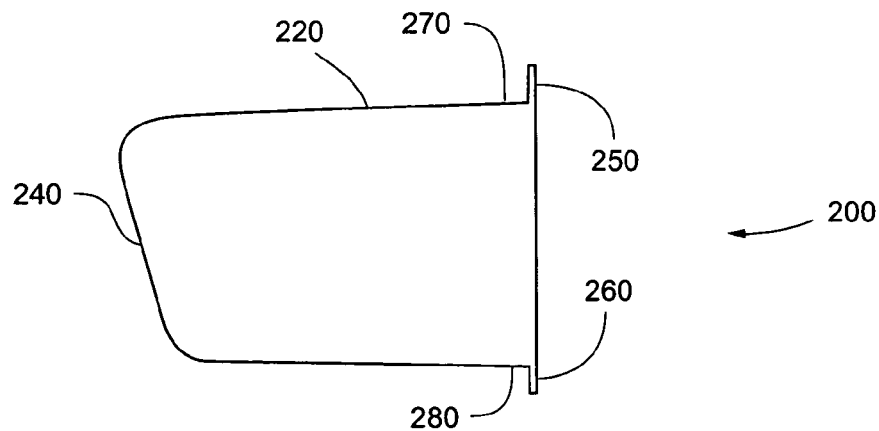
FIG. 5 is a side view of the tree stand cover depicted in FIG. 4.
Figure 4:
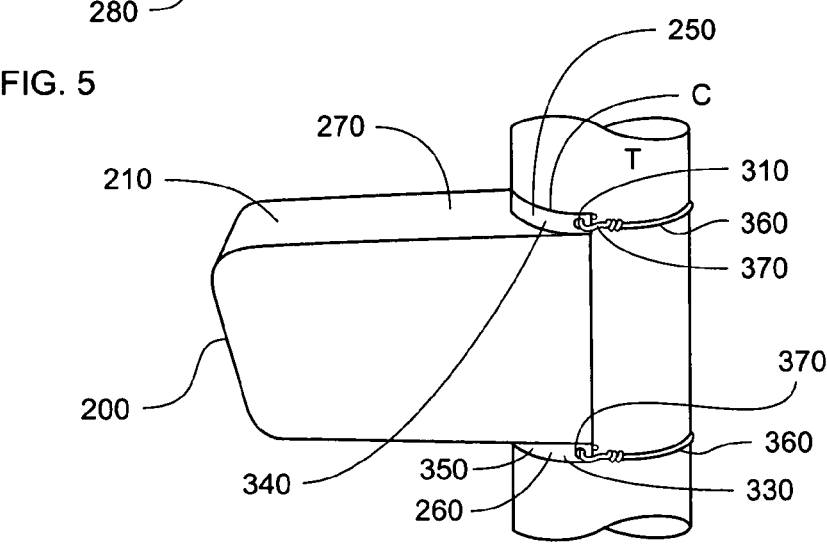
FIG. 4 is a perspective view of a tree stand cover according to the preferred embodiment of the present invention shown as installed over a prior-art tree stand apparatus.

Referring now to FIGS. 4–6, cover 200 is preferably made of a fabric-type material and preferably comprises body 210, first side 220, second side 230, central section 240, top edge 250 and bottom edge 260. Central section 240 preferably further includes first end 270 and second end 280. First side 220 and second side 230 preferably conform linearly to each generally linear upright side of tree T. Top edge 250 preferably extends from first end 270 of central section 240 and bottom edge 260 extends from second end 280 of central section 240, wherein top edge 250 and bottom edge 260 are preferably fixably attached to first end 270 and second end 280, respectively, or integrally formed therewith.

The fabric-type material utilized to form cover 200 is preferably waterproof, comprised of a material such as, for exemplary purposes only, GORE-TEX and/or treated with compounds that impart odor elimination properties to cover 200. The fabric-type material may incorporate both of these features via a single layer composition, or a two-later construction, such as, for exemplary purposes only, GORE-TEX SUPPRESCENT and DUPONT CORDURA, wherein carbon-based or other odor suppressing materials may be included therein. The fabrics utilized in forming cover 200 are suitably flexible to facilitate collapsing cover 200 into a compact arrangement for ease in transport and storage. Alternatively, cover 200 could be formed of any water-resistant material, such as, for exemplary purposes only, plastic.

Additionally, the fabric material of cover 200 preferably has a camouflage pattern printed thereon. One skilled in the art would readily recognize that cover 200 could alternately be formed from plastic, canvas, or any other suitable material. Further, camouflage netting and/or three-dimensional camouflaging could be utilized in lieu of, or in addition to, a camouflage pattern.

Preferably located at first end 290 and second end 300 of top edge 250 are mounting apertures 310, such as, for exemplary purposes only, grommets or eyelets. Preferably located at first end 320 (not shown) and second end 330 of bottom edge 260 are mounting apertures 310, such as, for exemplary purposes only, grommets or eyelets.

Top edge 250 and bottom edge 260 are preferably generally arcuately-shaped, thereby enabling formation into curvatures 340 and 350, respectively, wherein curvatures 340 and 350 preferably extend parallel to the growth axis of tree T, and wherein top edge 250 and bottom edge 260 are disposed against the tree surface throughout their entire curvatures 340, 350, thereby generally conforming to curvature C of tree T. Curvature 340 of top edge 250 and curvature 350 of bottom edge 260 preferably essentially seal or rest substantially tightly against tree T to preferably minimize or substantially prevent weather or other elements from entering into cover 200.

Cover 200 is preferably installed over prior art tree stand 10 by preferably placing cover 200 over apparatus 10 and preferably pulling top edge 250 and bottom edge 260 towards tree T, wherein curvature 340 of top edge 250 and curvature 350 of bottom edge 260 preferably lie proximate tree T. Bungee cords 360 are preferably stretched around tree T and preferably attached via hook ends 370 to mounting apertures 310, thereby preferably securing cover 200 over tree stand 10. When installed in such preferred manner, cover 200 essentially prevents weather or other elements from contact with tree stand 10 within.

Figure 7:
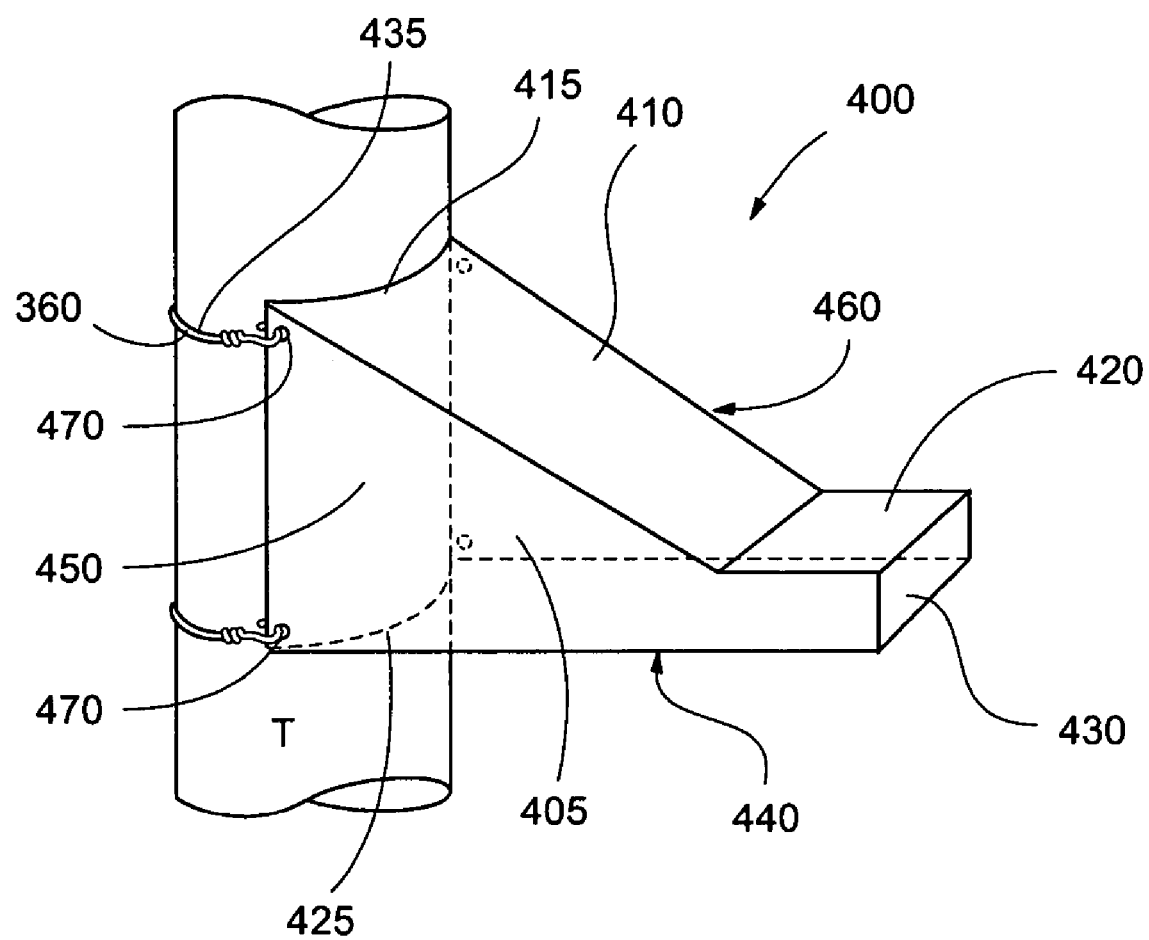
FIG. 7 is a perspective view of a tree stand cover according to an alternate embodiment of the present invention, shown installed over the tree stand seat component of FIG. 2.

Referring now to FIG. 7, there is shown tree stand cover 400 according to an alternate embodiment of the present invention. Cover 400 has body 405, wherein body 405 comprises top 410, seat cover 420, bottom 440 and front section 430. Body 405 further comprises curved top edge 415 and curved bottom edge 425, left side 450 and right side 460, and tree mounting means 435, such as, for exemplary purposes only bungee cords 360. Bungee cords 360 attach to cover 400 via grommets 470, wherein bungee cords 360 pass behind tree T, thereby retaining cover 400 in place over tree stand seat platform component 30. However, in this embodiment, cover 400 is sized and shaped to cover only seat platform component 30 of tree stand 10. This particular cover 400 is designed for covering specific tree stands made by particular manufacturers. In this alternate embodiment, the dimensions of body section 405, front section 430, curved top edge 415, curved bottom edge 425, left side 450 and right side 460 can be varied according to the dimensions of seat platform component 30. It will be understood that cover 400 can be made to closely fit a particular model of tree stand or it can be made to be "universal" so that, while it fits some tree stands loosely, it fits all or most all known tree stands currently on the market.

Figure 8:
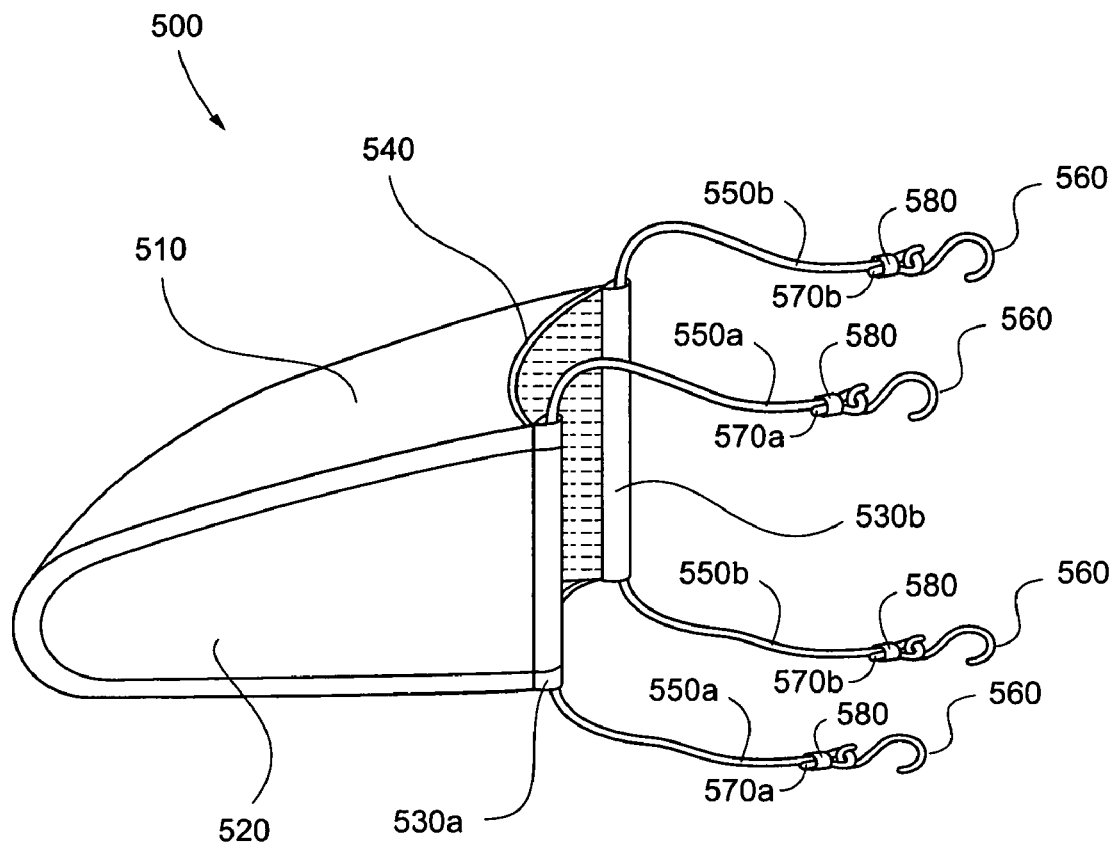
FIG. 8 is a perspective view of a tree stand cover according to a second alternate embodiment of the present invention.

Referring now to FIGS. 7–8, in another alternate embodiment of the present invention, tree stand cover 500 comprises body 510, sides 520, channels 530a and 530b, edge beads 540, and elastic cords 550a and 550b. Elastic cords 550a and 550b pass through channels 530a and 530b, respectively. Elastic cords 550a and 550b terminate in hooks 560, wherein hooks 560 are secured by looping ends 570a and 570b through hooks 560 and securing ends 570a and 570b with clips 580 to elastic cords 550a and 550b, respectively. Tree stand cover 500 can be utilized in lieu of tree stand cover 400 (best shown in FIG. 7), wherein tree stand cover 500 can be placed over seat platform component 30 of tree stand 10. Beads 540 provide a seal against a tree trunk, preventing moisture and debris from reaching seat platform component 30. Elastic cords 550a and 550b can then be extended around the tree trunk and secured to one another, thereby retaining tree stand cover 500 over seat platform component 30.

In an alternative embodiment of the present invention, tree stand cover 400 can be sized and shaped for covering only the seat and/or another fabric/padded part of seat platform component 30 of the tree stand, or for covering the standing platform component 20.

In another alternative embodiment of the present invention, tree stand cover 400 can have one or more open sides 450, 460.

In yet another alternate embodiment of the present invention sides 450 and 460 may have openings therein for access within apparatus 400.

In still another alternative embodiment of the present invention, tree stand cover 400 can be provided as a kit in a package including bungee cords 360.

In a further alternate embodiment of the present invention it is envisioned that covers 200 and 400 can be made of a resilient material, thereby permitting them to encase tree stands of different sizes via elasticity of shape.

In yet another alternative embodiment of the present invention, tree stand cover 400 has two or more segments that are adjustable relative to each other for covering a variety of different tree stands.

In still yet another alternate embodiment, it is contemplated that top edge 250 and bottom edge 260 of cover 200 could be formed of elastic to retain cover 200 over tree stand 10, and curved top edge 415 and curved bottom edge 425 of cover 400 could similarly be formed of elastic to retain cover 400 over seat platform component 30.

It is contemplated in an alternate embodiment of the present invention that covers 200 and 400 could be made without edges, as shown in FIG. 7.

It is contemplated in another alternate embodiment of the present invention that covers 200 and 400 could be supported via a framework, particularly a flexible framework that could be carried in a collapsed form, yet be rapidly expandable in the field for application over tree stand 10.

It is contemplated in still another alternate embodiment that carabiners could be utilized in place of hook ends 370 of bungee cords 360.

It is contemplated in yet another alternate embodiment that covers 200 and 400 could have tops that snap open to facilitate placement around seat platform component 30 while standing on tree stand 10 and/or to facilitate storage of equipment within enclosure of covers 200 and 400.

It is contemplated in still another alternate embodiment that covers 200 and 400 could be secured via retractable straps, a plurality of snaps, hooks, buttons, hook-and-loop strips or other fasteners, or by other means for securing covers 200 and 400 to trees of different diameter.

Additionally, in some embodiments the present invention can be treated to advantageously neutralize human scents on seat 130 and/or other portions of the tree stand so that deer, or other animals, are not scared away from the area.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely numbering or listing the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A frameless cover for covering a tree mounted hunting stand having a seat, said cover comprising:
   a cover body, said cover body dimensioned to substantially cover at least the seat of the hunting stand, said cover body having left and right sides adapted to generally conform to each linear upright side of a tree, said cover body having a top surface and a bottom surface defining an open side therebetween, and said cover body having arcuately shaped top and bottom edges extending outwardly from the top and bottom surfaces respectively, wherein said arcuately shaded top and bottom edges are adapted to conform to a curvature of a tree, said cover body having a plurality of apertures; and
   means for securing said cover to a tree.

2. The cover of claim 1, wherein said cover is treated with an odor-eliminating compound.

3. The cover of claim 1, wherein said means for securing said cover to the tree is a securing cord.

4. The cover of claim 3, wherein said securing cord is an elastic cord.

5. The cover of claim 3, wherein said securing cord has generally hook-shaped end connectors engaging with said apertures.

6. The cover of claim 1, wherein said cover body is substantially waterproof.

7. The cover of claim 1, wherein said cover body carries camouflage.

8. The cover of claim 1, wherein said cover body has resilient properties.

9. The cover of claim 1, wherein said means for securing said cover to the tree comprises elastic material.

10. A method for protecting a tree-mounted hunting stand having a seat, said method comprising the steps of:
   a. obtaining a frameless cover for the hunting stand, wherein said cover has an arcuately shaped top edge extending from a top surface and an arcuately shaped bottom edge, extending from a bottom surface each edge having extremities, and wherein said top and bottom edges have apertures carried at said extremities thereof, wherein said edge extremities comprise first extremity and second extremity at opposing ends of said edges, and wherein said apertures comprise first aperture carried at said first extremity and said second aperture carried at said second extremity;
   b. placing said cover over the hunting stand; with the arcuately shaped top and bottom edges being disposed to conform to the curvature of the tree and
   c. securing the cover to the tree.

11. The method of claim 10, said step of securing further comprising the step of:

i. obtaining at least one elastic cord having first hook end and second hook end;

ii. attaching said first hook end of said at least one elastic cord to one of said apertures;

iii. passing said at least one elastic cord around the back of the tree; and iv. securing said second hook end to a second aperture, whereby said cover is removably held in place on the hunting stand.

12. The method of claim 11, wherein said at least one elastic cord comprises a bungee cord.

13. The method of claim 10, wherein said cover is comprised of waterproof material.

14. The method of claim 10, wherein said cover carries a camouflage pattern thereon.

15. A frameless cover for covering a hunting stand, said cover comprising:

at least one sheet of material formed into a body section, said body section comprising arcuately shaped curved top and bottom edge portions extending outwardly from top and bottom and adapted to be parallel to the tree's growth axis, wherein said arcuately shaped curved top and bottom edge portions are adapted to be disposed against the tree surface through entire curvature of said arcuately shaped curved top and bottom edge portions; and said arcuately shaped curved top and bottom edge portions including a plurality of apertures an end section; and means for mounting said cover to the tree, wherein said means for mounting includes at least one elastic cord connecting with said apertures, and said cover is of a size and shape to be suited for covering existing tree stand seats.

* * * * *